US012766693B2

(12) United States Patent
Walker et al.

(10) Patent No.: US 12,766,693 B2
(45) Date of Patent: Oct. 20, 2026

(54) LATCH ASSEMBLY FOR SECURING BATTERY INSIDE BATTERY HOUSING OF POWER EQUIPMENT

(71) Applicant: Honda Motor Co., Ltd., Tokyo (JP)

(72) Inventors: Christopher Todd Walker, Hillsborough, NC (US); Shivang Desai, Portland, OR (US)

(73) Assignee: Honda Motor Co., Ltd., Tokyo (JP)

(*) Notice: Subject to any disclaimer, the term of this patent is extended or adjusted under 35 U.S.C. 154(b) by 324 days.

(21) Appl. No.: 18/584,854

(22) Filed: Feb. 22, 2024

(65) Prior Publication Data

US 2025/0268134 A1 Aug. 28, 2025

(51) Int. Cl.

| | |
|---|---|
| ***B25F 5/02*** | (2006.01) |
| ***F16B 2/20*** | (2006.01) |
| ***H01M 50/213*** | (2021.01) |
| ***H01M 50/262*** | (2021.01) |
| *A01D 34/68* | (2006.01) |
| *A01D 34/78* | (2006.01) |

(52) U.S. Cl.

CPC .................. *B25F 5/02* (2013.01); *F16B 2/20* (2013.01); *H01M 50/213* (2021.01); *H01M 50/262* (2021.01); *A01D 34/68* (2013.01); *A01D 34/78* (2013.01); *H01M 2220/30* (2013.01)

(58) Field of Classification Search

CPC ........... H01M 2220/30; H01M 50/262; H01M 50/213; F16B 2/20; B25F 5/02; A01D 34/81; A01D 34/78; A01D 34/68

See application file for complete search history.

(56) References Cited

U.S. PATENT DOCUMENTS 7,242,164 B2 * 7/2007 Fukushima ......... H01M 50/204 320/112
7,413,460 B2 * 8/2008 Matthias ................... B25F 5/02 173/217
7,701,172 B2 * 4/2010 Watson ...................... B25F 5/02 320/113
8,356,684 B2 1/2013 Boegelein et al.
8,653,786 B2 2/2014 Baetica et al.
8,935,907 B2 1/2015 Abe et al.
9,711,767 B2 * 7/2017 Juenger .................. A01D 69/02
10,230,078 B2 3/2019 Kubota et al.
11,967,730 B2 * 4/2024 Hennesy ................... B25F 5/02
2009/0148755 A1 * 6/2009 Heinzen .............. H01M 50/296 429/163

(Continued)

FOREIGN PATENT DOCUMENTS

CA 2961092 A1 * 9/2017 ................ B25F 5/02
CN 2905528 Y 5/2007

(Continued)

*Primary Examiner* — Arpad Fabian-Kovacs

(74) *Attorney, Agent, or Firm* — Joshua Freier; American Honda Motor Co., Inc.

(57) ABSTRACT

A latch assembly for a power equipment includes a lever configured to pivot about a fulcrum, a latch button coupled to the lever and configured to move vertically in response to the pivoting of the lever about the fulcrum, and a roller rotatably engaged to the latch button and adapted to be removably engaged with a battery of the power equipment to removably secure the battery inside a battery housing of the power equipment.

20 Claims, 7 Drawing Sheets

(56) References Cited

U.S. PATENT DOCUMENTS

| | | | | |
|---|---|---|---|---|
| 2011/0116861 | A1* | 5/2011 | Zhang | H01M 50/262 403/322.1 |
| 2021/0083237 | A1* | 3/2021 | Cherry | H01M 50/24 |
| 2022/0045399 | A1 | 2/2022 | Hennesy et al. | |
| 2022/0074156 | A1 | 3/2022 | Li | |
| 2024/0276912 | A1* | 8/2024 | Desai | A01D 34/68 |

FOREIGN PATENT DOCUMENTS

| | | | | | |
|---|---|---|---|---|---|
| CN | 205727121 | U | | 11/2016 | |
| CN | 111933857 | A | | 11/2020 | |
| CN | 113574724 | A | * | 10/2021 | H01M 50/20 |
| CN | 21605830 | U | | 3/2022 | |
| CN | 217396287 | U | | 9/2022 | |
| DE | 102004047342 | A1 | | 3/2006 | |
| EP | 2299516 | A1 | | 3/2011 | |
| JP | H09220937 | A | | 8/1997 | |
| KR | 20040094943 | A | | 11/2004 | |
| WO | WO-2009114867 | A1 | * | 9/2009 | A47L 9/00 |
| WO | 2017220009 | A1 | | 12/2017 | |

* cited by examiner

LATCH ASSEMBLY FOR SECURING BATTERY INSIDE BATTERY HOUSING OF POWER EQUIPMENT

BACKGROUND

The disclosed subject matter relates to a latch assembly for a power equipment. More particularly, the disclosed subject matter relates to a latch assembly that facilitates an easy engagement and disengagement of a battery with a battery housing of a power equipment.

Power equipment, such as lawnmowers, hedge trimmers, string trimmers, power saws, tillers, snow blowers, portable coolers, E-Bikes, and scooters may be operated by an electric motor, or a hybrid of an internal combustion engine and an electric motor. A battery mounted on the power equipment supplies power to the electric motor. The battery is removably mounted onto the power equipment and includes a latch to lock or unlock the battery from a battery housing. However, sometimes, it is difficult to remove the battery from the power equipment, especially in high friction situations, which is undesirable.

SUMMARY

In accordance with one embodiment of the present disclosure, a latch assembly for a power equipment is disclosed. The power equipment includes a battery housing and a battery removably arranged inside the battery housing. The latch assembly includes a lever configured to pivot about a fulcrum, a latch button coupled to the lever and configured to move vertically in response to the pivoting of the lever about the fulcrum. The latch assembly also includes a roller rotatably engaged to the latch button and adapted to be removably engaged with the battery to removably secure the battery inside the battery housing.

In accordance with another embodiment of the present disclosure, a power equipment is disclosed. The power equipment includes a battery housing, a battery removably coupled to the battery housing, and a latch assembly configured to removably secure the battery with the battery housing. The latch assembly includes a lever configured to pivot about a fulcrum, a latch button coupled to the lever and configured to move vertically in response to the pivoting of the lever about the fulcrum. The power equipment further includes a roller rotatably engaged to the latch button and adapted to be removably engaged with the battery to removably secure the battery inside the battery housing.

In accordance with yet a further embodiment of the present disclosure a lawnmower is disclosed. The lawnmower includes a cutter housing including a blade chamber, a plurality of wheels connected to and supporting the cutter housing, a blade arranged at least partially in the blade chamber and rotatably mounted to the cutter housing to rotate about a blade axis, and a battery supported on the cutter housing. The lawnmower further includes a motor mounted on the cutter housing to drive the blade, a lever pivotably supported on the cutter housing, a latch button coupled to the lever and configured to move vertically in response to the pivoting of the lever about the fulcrum, and a roller rotatably engaged to the latch button and adapted to be removably engaged with the battery to removably secure the battery inside the battery housing.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-7, wherein like numbers indicate the same or corresponding elements throughout the views.

Figure 1:
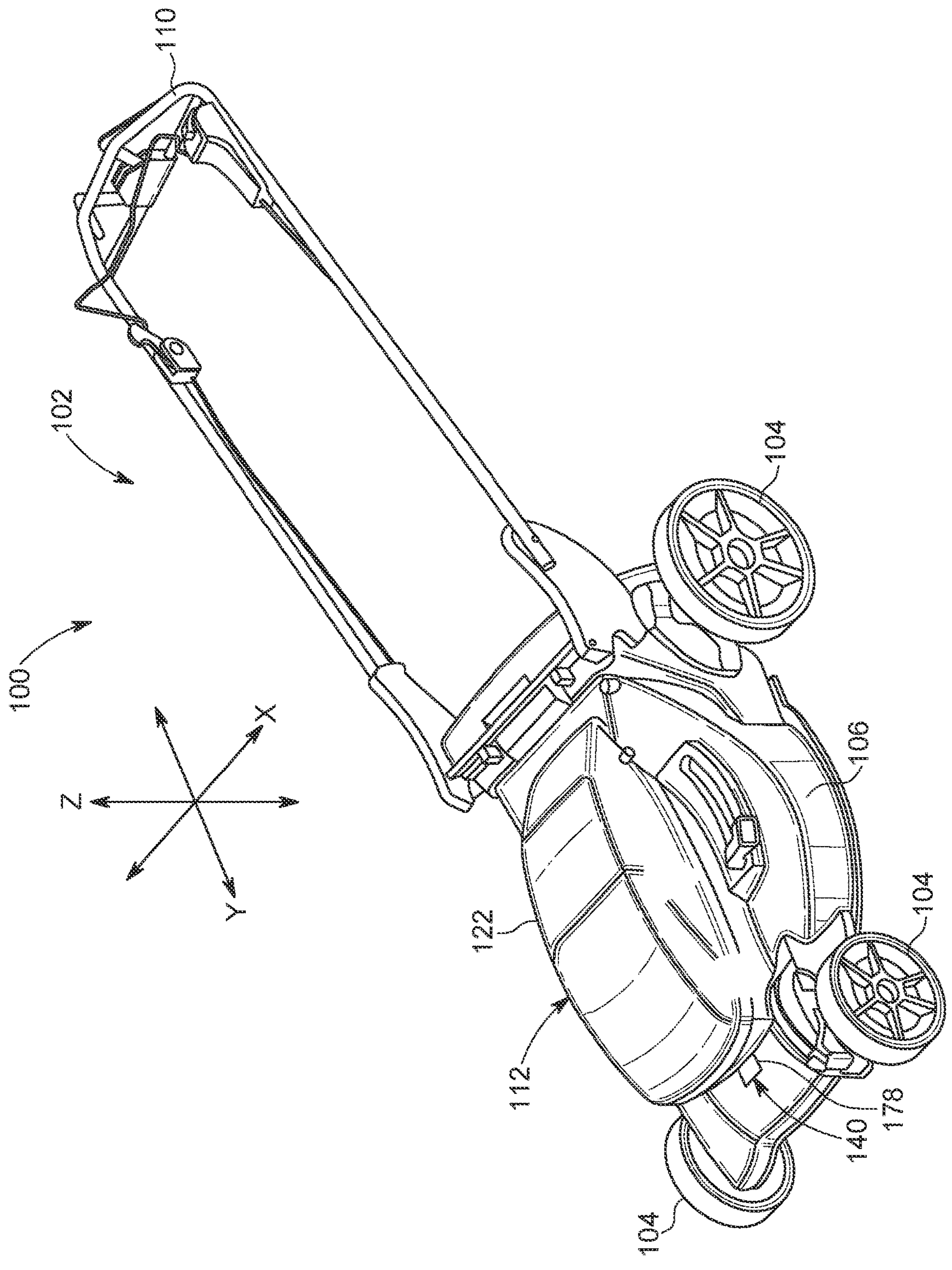
FIG. 1 is a perspective view of a power equipment, in accordance with one embodiment of the present disclosure.

FIG. 1 illustrates a power equipment 100 according to an embodiment of the disclosure. In the illustrated embodiment, the power equipment 100 is a lawnmower 102, however, it may be appreciated that the power equipment 100 may be a tiller, a trimmer, snow blowers, portable coolers, e-bike, or any other similar equipment known in the art. The power equipment 100 may extend along an X-direction, a Y-direction and a Z-direction, which directions are orthogonal to each other. As shown, the power equipment 100 includes a plurality of traction members, for example, wheels 104 or tracks, to enable the movement of the power equipment 100 over a surface. Further, the power equipment 100 includes a cutter housing 106 including a blade chamber 108 and supported on the wheels 104, a handle 110 to enable a holding of the power equipment 100 by a user, and a power source assembly 112. The cutter housing 106 may be referred to as a mower deck or as a cutter deck or as a deck.

Figure 2:
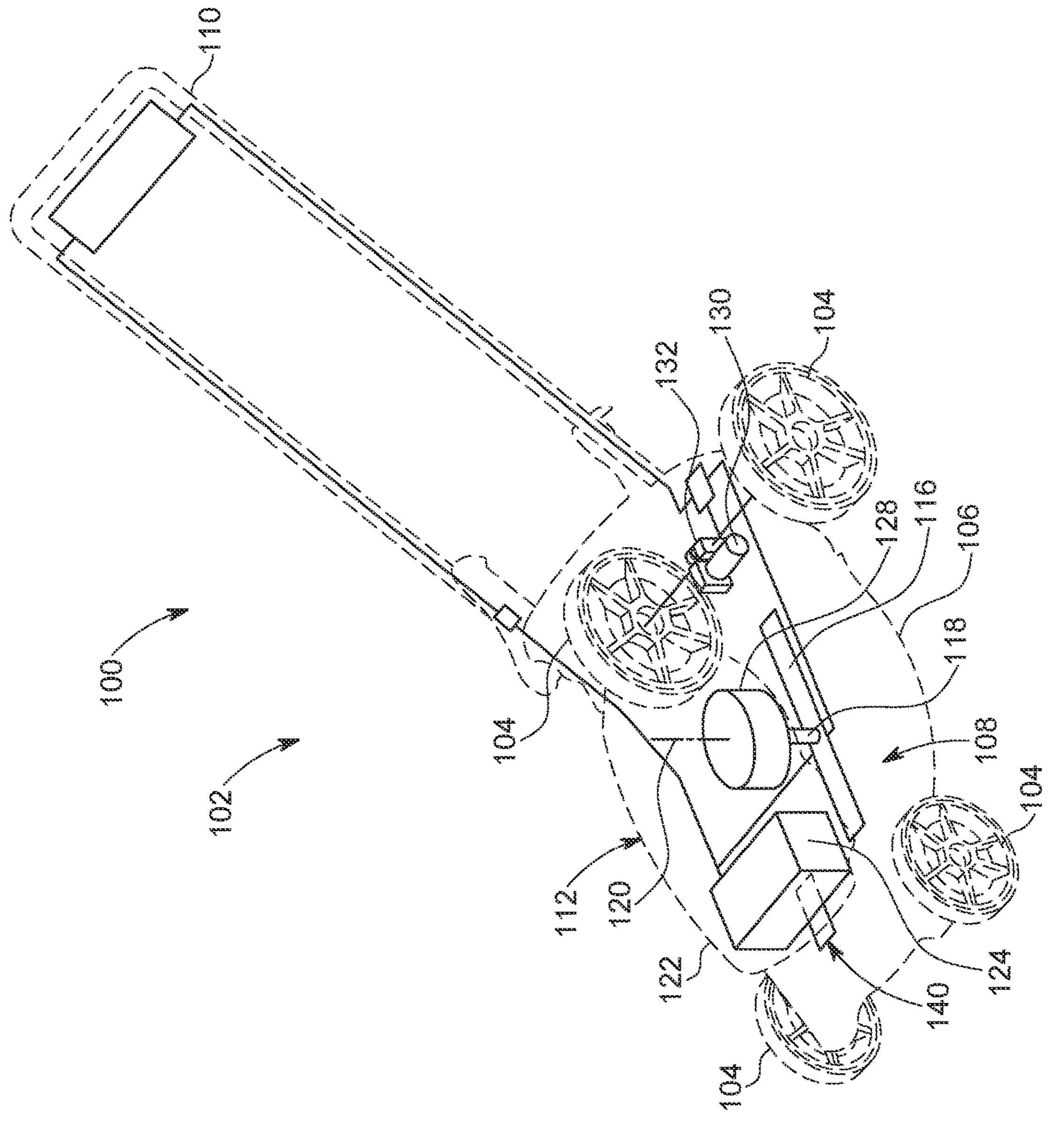
FIG. 2 illustrates a perspective schematic view of the power equipment of FIG. 1 with exterior portions of the power equipment shown in phantom and depicting various internal components of the power equipment, in accordance with one embodiment of the present disclosure.

Referring to FIG. 2, the power equipment 100 includes a blade 116 rotatably mounted to the cutter housing 106 and arranged at least partially inside the blade chamber 108 and a blade shaft 118 connecting the blade 116 and the power source assembly 112. The power source assembly 112 is configured to selectively rotate the blade shaft 118 and the blade 116 in the cutter housing 106 about a blade axis 120 which extends in the Z-direction. The power source assembly 112 includes a battery housing 122, a battery 124 removably arranged inside the battery housing 122, a blade motor 128 powered by the battery 124 to rotate the blade 116, a propulsion motor 130 powered by the battery 124, a transmission 132 operatively connecting the propulsion motor 130 to the rear wheels 104 to operate the wheels 104. In an embodiment, the transmission 132 may be omitted.

Figure 6:
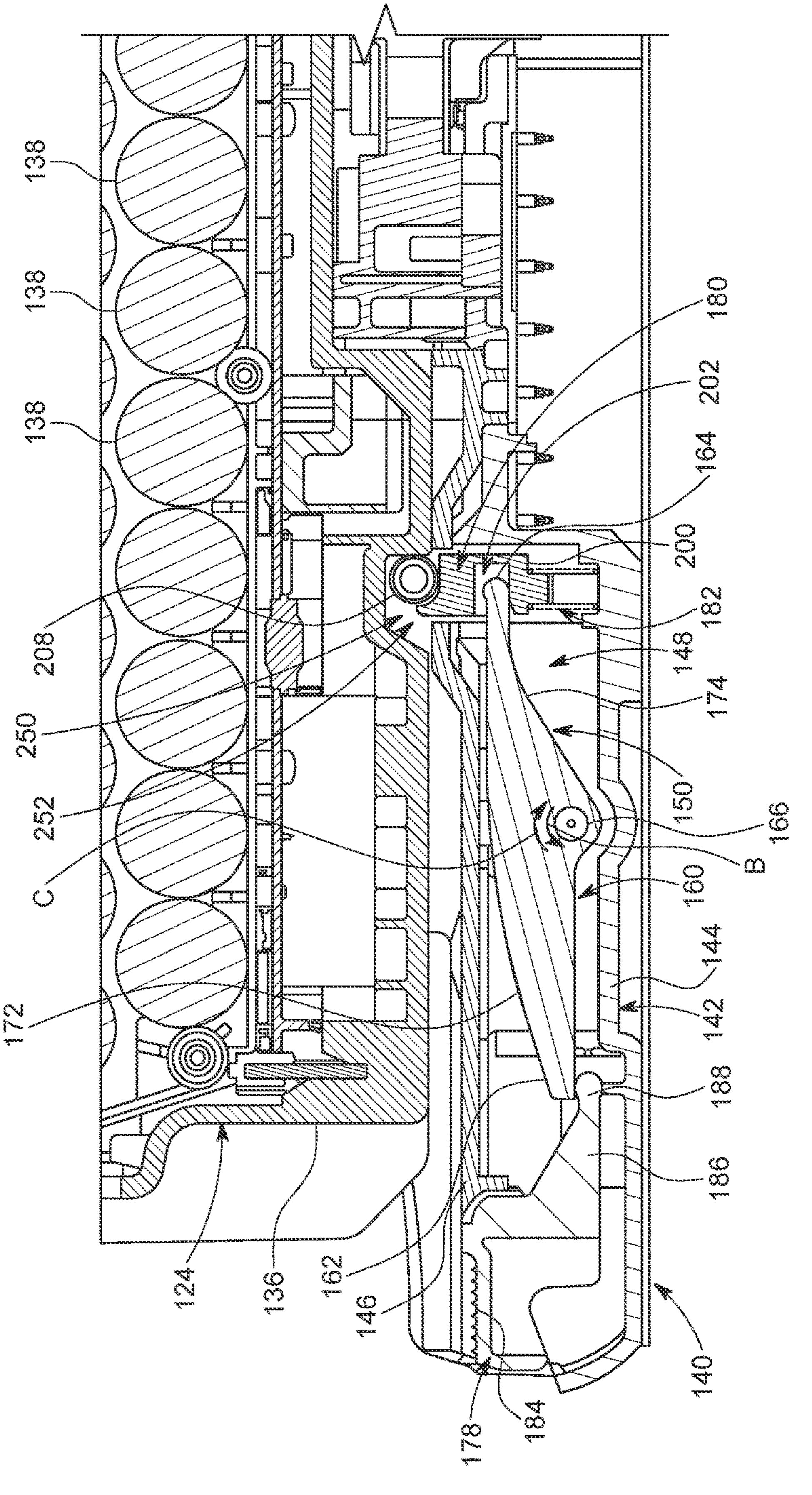
FIG. 6 illustrates a sectional view of the power equipment depicting the latch connected to the battery and retaining the battery inside the battery housing, in accordance with one embodiment of the present disclosure.
Figure 7:
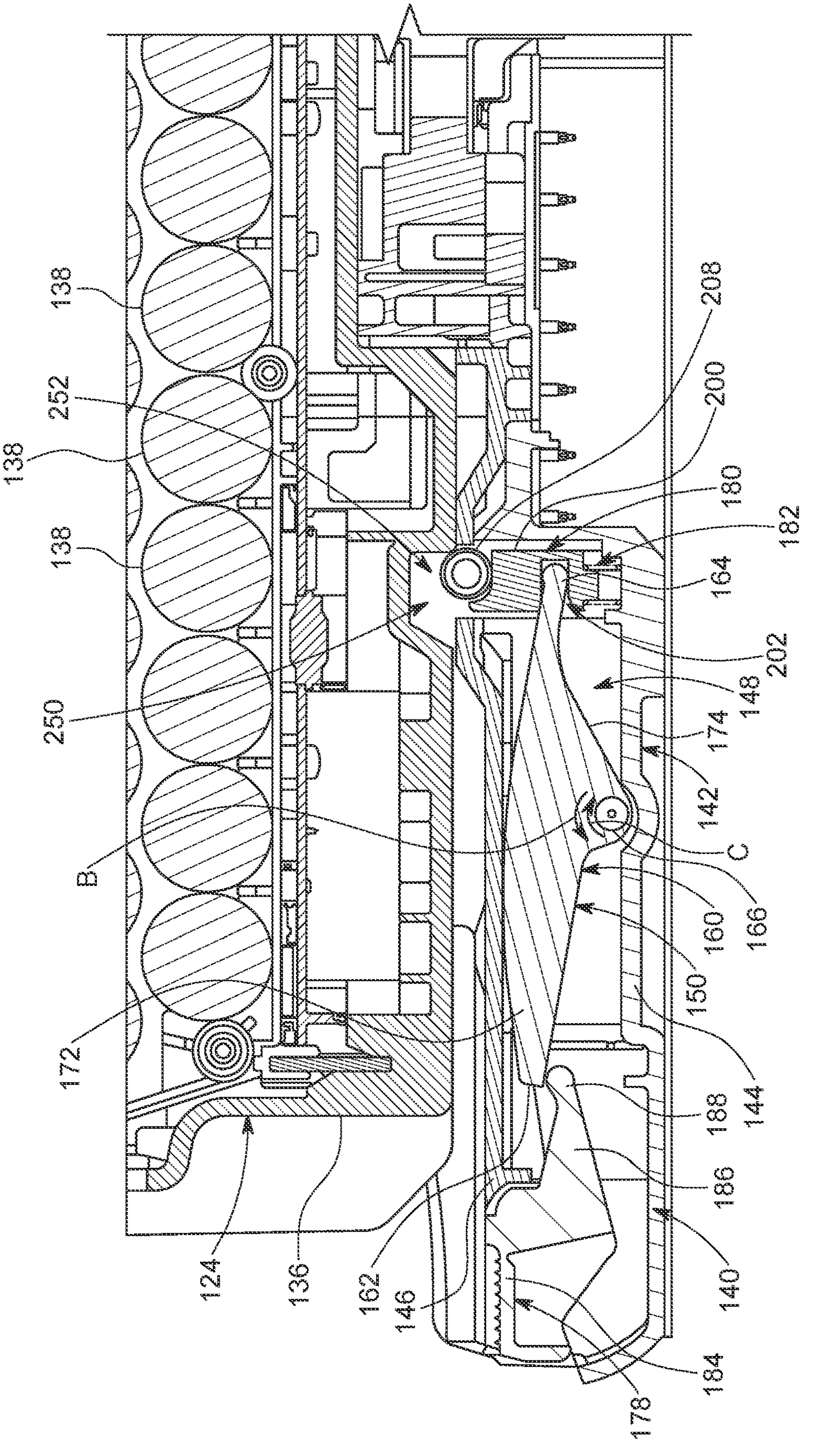
FIG. 7 illustrates a sectional view of the power equipment depicting the latch disengaged from the battery to enable a removal of the battery from the battery housing, in accordance with one embodiment of the present disclosure.

Referring to FIGS. 2, 6 and 7, the battery 124 includes a battery case 136 and a plurality of battery cells 138 arranged within the battery case 136, and the battery 124 is removably arranged inside a chamber or receptacle of the battery housing 122. To enable the insertion of the battery 124 inside the battery housing 122 and removal of the battery 124 from the battery housing 122, the battery housing 122 defines an opening. In some embodiments, a lid may be arranged covering the opening of the battery housing 122. The opening is arranged/positioned/oriented towards the front end of the power equipment 100 and the battery 124 is inserted into and removed from the battery housing 122 in the Y-direction. Moreover, the battery housing 122 prevents movement of the battery 124 in the X-direction and the Z-direction.

Figure 3:
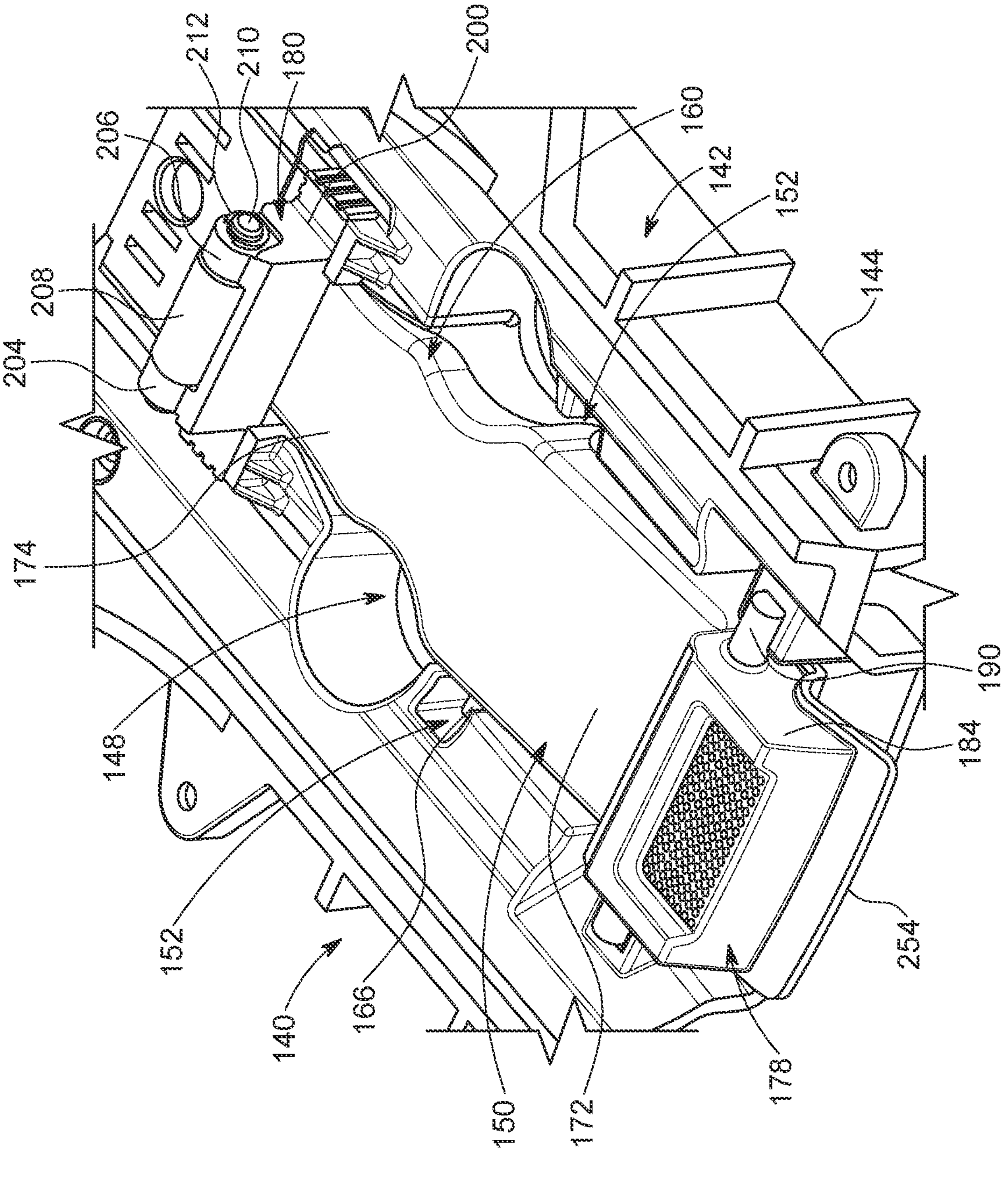
FIG. 3 illustrates a top perspective view of a latch assembly for selectively securing a battery of the power equipment inside a battery housing of the power equipment, in accordance with one embodiment of the present disclosure.
Figure 4:
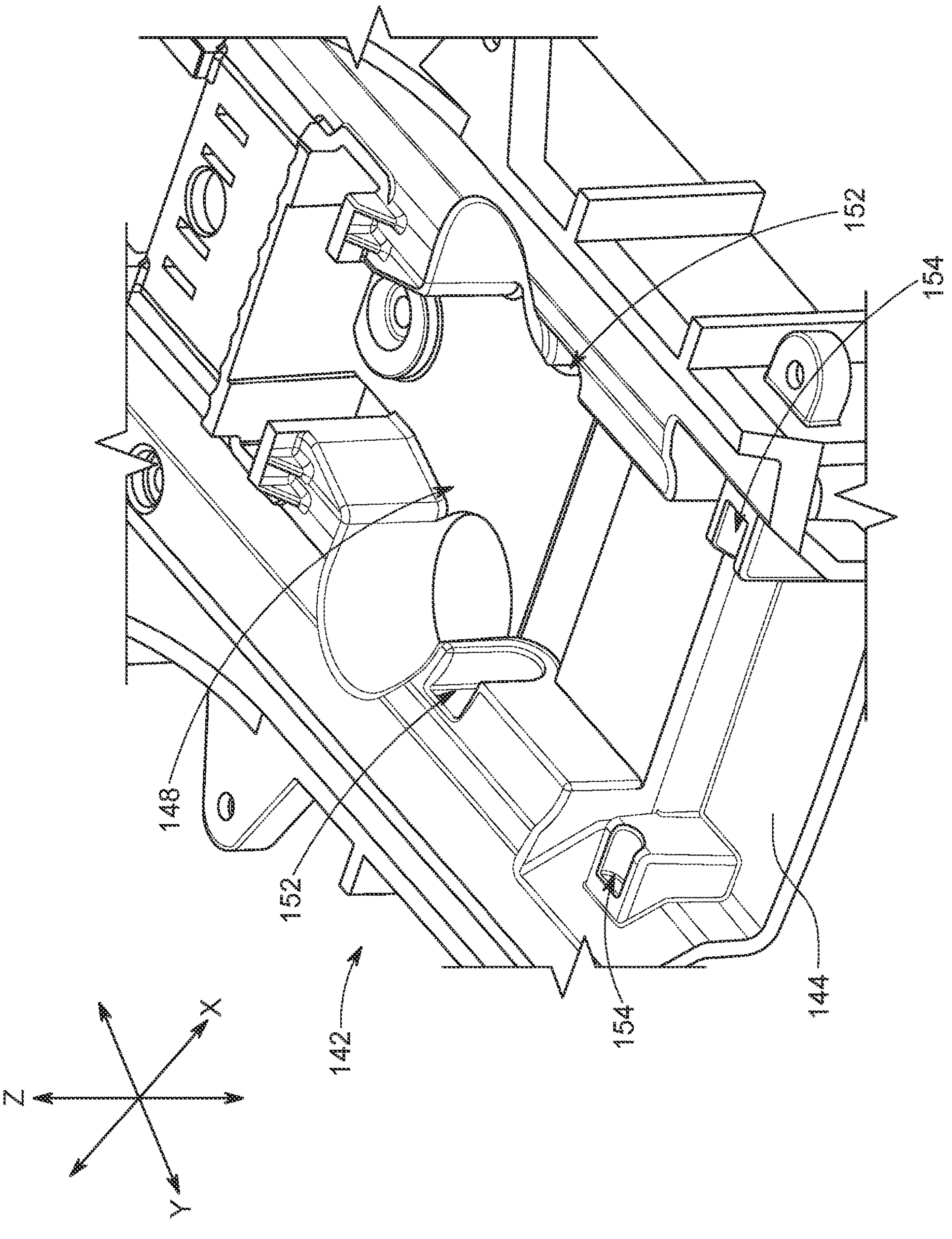
FIG. 4 illustrates a top perspective view a latch housing of the latch assembly of FIG. 3, in accordance with one embodiment of the present disclosure.
Figure 5:
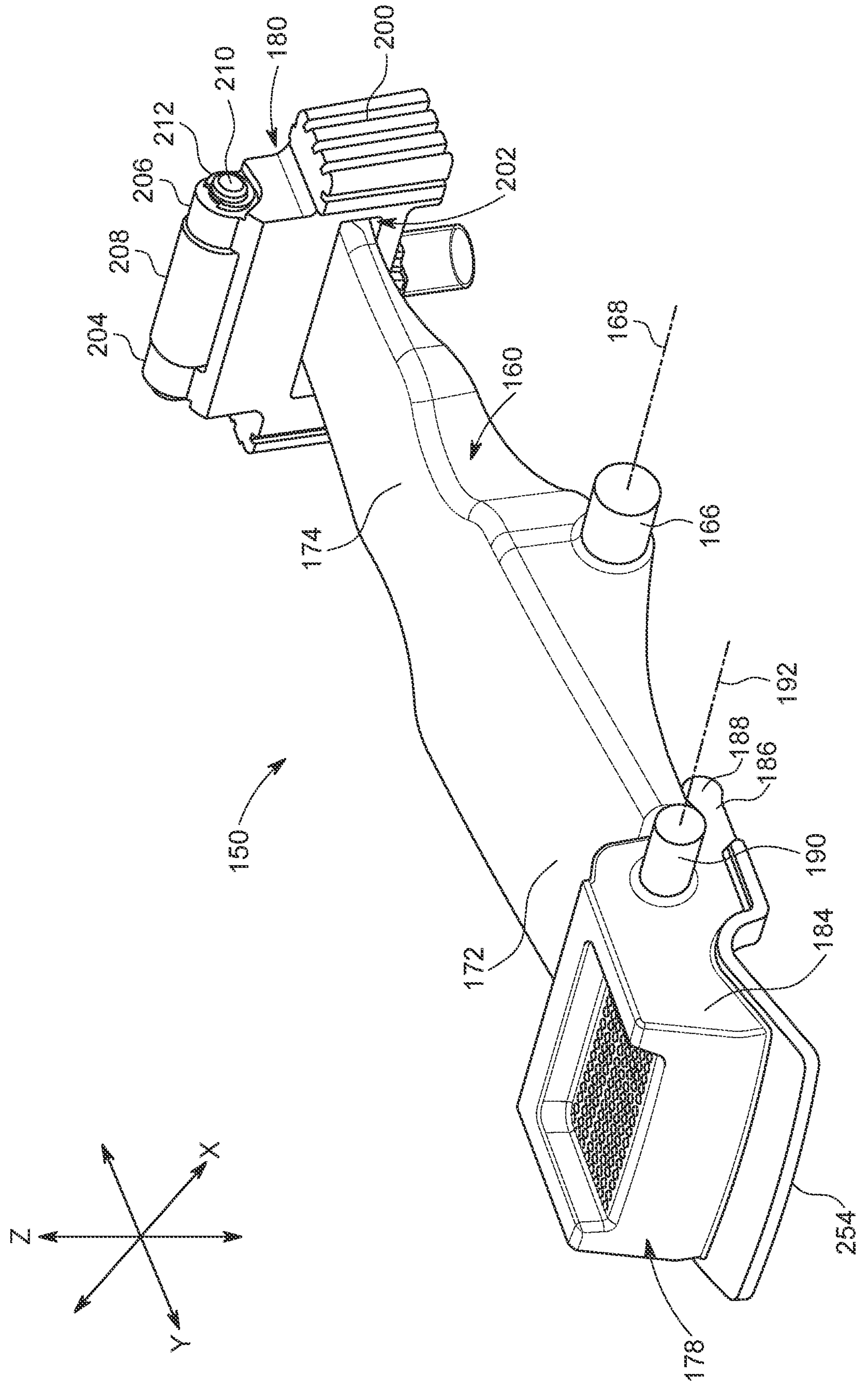
FIG. 5 is a top perspective view of a latch of the latch assembly of FIG. 3, in accordance with one embodiment of the present disclosure.

Additionally, to retain the battery 124 within the battery housing 122 and lock the battery 124 with the battery housing 122 and release the battery 124 from the battery housing 122, the power equipment 100 includes a latch assembly 140. As shown in FIGS. 1 and 2, the latch assembly 140 is disposed proximal to the front end of the cutter housing 106 relative to a rear end of the cutter housing 106 in the Y-direction. As shown in FIGS. 3, 4, 6, and 7, the latch assembly 140 includes a latch housing 142 having a base 144 and a cover 146 arranged opposite to the base 144 and defining a chamber 148 therebetween, and a latch 150 arranged at least partially inside the latch housing 142 and adapted to be engaged with the battery case 136 to retain the battery 124 within the battery housing 122. As best shown in FIGS. 3 and 4, the latch housing 142 is coupled with the battery housing 122, and the latch housing 142 defines a pair of aligned first grooves 152 and a pair of aligned second grooves 154 extending in the X-direction for supporting the latch 150 that extends in the Y-direction. Although the latch housing 142 is shown to be coupled to the battery housing 122, it may be envisioned that the latch housing 142 may be integral to the battery housing 122.

Referring to FIGS. 3, 5, 6, and 7, the latch 150 includes a lever 160 that extends in the Y-direction and has a first end 162 arranged proximate to the front end of the battery housing 122 and a second end 164 arranged distally from the front end of the battery housing 122. Moreover, the latch 150 includes a first pin 166 extending through the lever 160 in the X direction and arranged inside the first grooves 152. The lever 160 is arranged to rotate/pivot relative to the first pin 166 and rotates about a central axis 168/rotation axis 168 of the first pin 166. Accordingly, the first grooves 152 and the first pin 166 together define a fulcrum of the lever 160 about which the lever 160 pivots/rotates between a first position (shown in FIG. 6) and a second position (shown in FIG. 7). In the first position, the first end 162 of the lever 160 is arranged vertically downwardly (in the Z-direction) relative to the second end 164 of the lever 160, while in the second position, the lever 160 is disposed vertically upwardly (in the Z-direction) relative to the second end 164. It may be appreciated that the lever 160 is biased to the first position, shown in FIG. 5. For so doing, a biasing member, for example, a spring 182 (best shown in FIGS. 6 and 7), extends between the latch housing 142 and the latch 150. For example, the spring 182 extends in a vertical direction with one end connected to the latch 150 at a position proximate to the second end 164 of the lever 160 and other end of the spring 182 is connected to the base 144 of the latch housing 142. Also, the lever 160 includes a first lever portion 172 extending from the first end 162 to the first pin 166 and a second lever portion 174 extending from the second end 164 to the first pin 166.

Moreover, the latch 150 includes a push button 178 arranged at the first end 162 of the lever 160 and engaged with the first lever portion 172 and a latch button 180 disposed at the second end 174 of the lever 160 and connected to the second lever portion 174. The push button 178 is adapted to be operated by a user to move the lever 160 from the first position to the second position. To enable such a movement of the lever 160, the push button 178 includes a handle portion 184 adapted to be pushed downwardly in the Z direction by a user, and an engagement portion 186, for example, a tab 188, arranged in engagement with the first lever portion 172 of the lever 160 and extending in the Y-direction from the handle portion 184.

Moreover, the latch 150 includes a second pin 190 that is arranged at an interface of the handle portion 184 and the engagement portion 186 and extends through the push button 178 in the Y direction and end portions of the second pin 190 are arranged inside the second grooves 154. Accordingly, the handle portion 184 extends from a first end of the push button 178 to the second pin 190, while the engagement portion 186 extends from a second end of the push button 178 to the second pin 190. Also, the engagement portion 186 is arranged vertically below (in Z direction) of the second pin 190 and the handle portion 184, and supports the first lever portion 172. Accordingly, the engagement portion 186 is arranged underneath the lever 160 (i.e., first lever portion 172) contacting the first lever portion 172.

The push button 178 is arranged to rotate/pivot relative to the second pin 190 about a central axis/rotation axis 192 of the second pin 190. Accordingly, the second pin 190 and the second grooves 154 together define a fulcrum about which the push button 178 rotates/pivots. It may be appreciated that the engagement portion 186 moves vertically upwardly in the Z-direction in response to the pushing of the handle portion 184 downwardly in the Z-direction. Due to the movement of the engagement portion 186 in the vertically upward direction, the first lever portion 172 also moves vertically upwardly to the second position, causing the second lever portion 174 of the lever 160 and hence the latch button 180 to move vertically downwardly as the lever 160 rotates/pivots about the fulcrum. As the push force on the handle portion 184 is removed, the handle portion 184 moves vertically upwardly due to the biasing force applied by the spring 182 on the latch button 180. It may be appreciated that the latch 150 and hence the latch button 180 is disengaged from the battery case 136 as the second end 164 of the lever 160 moves vertically downwardly i.e., in response to the pushing of the handle portion 184 of the push button 178 in the downward direction, while the latch 150 and hence the latch button 180 re-engages with the battery case 136 as the second lever portion 174 and hence the latch button 180 moves upwardly as the downward push force is removed from the handle portion 184.

Referring to FIGS. 3, 5, 6 and 7, the latch button 180 includes a body 200 coupled to the second lever portion 174 and extending in the Z-direction. As shown, the body 200 defines a cavity 202 (best shown in FIGS. 5, 6, and 7) and the second end 164 of the lever 160 is arranged/extend inside the cavity 202 to enable coupling of the lever 160 with the body 200. Accordingly, the latch button 180 is adapted to move in Z direction between a vertically upward position and a vertically downward position in response to the movement of the lever 160 to the first position and the second position, respectively. Therefore, the latch button 180 is biased to the vertically upward position by the spring 182, and is moved to the vertically downward position by pushing the handle portion 184 of the push button 178 downwardly. It may be appreciated that the latch button 180 is moved to the vertically upward position in response to the rotation/pivoting of the lever 160 in a first direction 'B', while the latch button 180 is displaced to the vertically downward position in response to the rotation of the lever 160 in a second direction 'C' about the central axis 192.

Further, the latch 150 includes roller 208 arranged at a top end of the body 200 and rotatably coupled to the latch button 180. To facilitate the rotatable coupling of the roller 208 with the latch button 180, the latch button 180 includes a pair of eye structures 204, 206 arranged spaced part from each other and facing each other defining a gap therebetween and the roller 208 is arranged inside the gap and is coupled to the eye structures 204, 206 via a shaft 210 that extends through the roller 208 and the eye structures 204, 206. As shown, the shaft 210, the roller 208, and the eye structures 204, 206, each extend in the X-direction, and the roller 208 is arranged to rotate relative to the shaft 210 about a central axis of the roller 208 or the shaft 210. Further, to prevent the movement of the shaft 210 in the X-direction relative to the roller 208 and the eye structures 204, 206, and to prevent the disengagement of the shaft 210 from the roller 208 and the eye structures 204, 206, the latch 150 includes a pair of clips 212 arranged at the ends of the shaft 210. It may be appreciated that the roller 208 is arranged engaged with the battery case 136 i.e., the battery 124 in the vertically upward position of the latch button 180, while the roller 208 is arranged outwardly of the battery case 136 i.e., disengaged from the battery case 136 in the vertically downward position of the latch button 180.

To facilitate the engagement of the battery 124 i.e., the battery case 136 with the roller 208, the battery case 136 defines a detent 250 i.e., slot 252, shown in FIGS. 6 and 7, that extends in the Z-direction. Therefore, in the vertically upward position of the latch button 180, shown in FIG. 6, the roller 208 is arranged inside the slot 252 and is arranged contacting the battery case 136, retaining and locking the battery 124 within the battery housing 122. To remove the battery 124 from battery housing 122, the roller 208 is moved outwardly of the slot 252 by moving the latch button 180 to the vertically downward position, shown in FIG. 7. For so doing, the user presses the handle portion 184 of the push button 178 downwardly in the Z direction, rotating the push button 178 about the central axis 192 in the first direction 'B'. Due to the rotation of the push button 178 in the first direction 'B' about the rotation axis 192 or the second pin 190, the engagement portion 186 of the push button 178 moves upwardly in the Z-direction, causing the first lever portion 172 to move upwardly in the Z-direction, thereby rotating the lever 160 about the central axis 168 i.e., rotation axis 168 in the second direction 'C'. As the lever 160 rotates/pivots in the second direction 'C', the second lever portion 174 moves downwardly in the Z direction, causing the latch button 180 to move to the vertically downwardly position, thereby moving the roller 208 out of the detent 250 i.e., slot 252 and disengaging the battery 124 from the battery housing 122 to enable the removal of the battery 124 from the battery housing 122. As the roller 208 rolls against the surface of the detent 250 i.e., battery case 136, the friction between the roller 208 and the battery case 136 is reduced, enabling the easy disengagement and removal of the battery 124 from the battery housing 122.

Additionally, the push button 178 includes a stopper 254 i.e., a lip 254 arranged connected to the handle portion 184 to restrict a downward movement of the handle portion 184 beyond a certain limit. As the stopper 254 is arranged to contact the cutter housing 106 upon downward movement of the handle portion 184, the stopper 254 prevents any additional downward movement of the handle portion 184 i.e., the push button 178.

It should be noted that the latch assembly as a whole may be oriented in any position. For example, the latch button may move in a horizontal movement (instead of vertical direction) in order to de-latch the battery. Alternatively, the latch button could move diagonally. The mix of terms such as "horizontal" and "vertical" motion should not bind the present disclosure in one specific orientation—each of the buttons and lever may move in various directions (including directions offset from vertical or horizontal directions) and still remain with the scope of the present disclosure.

In particular, the exemplary X-direction, Y-direction and Z-direction described above may represent a three-dimensional coordinate system for the lawnmower as an exemplary power equipment. However, alternate embodiments of the power equipment may be described by a three-dimensional XYZ coordinate system that is rotated relative to the XYZ coordinate system shown in FIG. 1. For example, instead of the Z-direction extending in a vertical direction and the X-direction and Y-direction extending in a horizontal direction as shown in FIG. 1, the XYZ coordinate system may be misaligned with respect to the vertical and horizontal directions.

Further, alternate embodiments of the latch assembly may be described by a three-dimensional coordinate system that is independent of the three-dimensional coordinate system of the power equipment.

The lawnmower may be a walk-behind lawnmower, a ride-on lawnmower, a zero-turn-radius lawnmower, a remote-controlled lawnmower, an autonomous lawnmower, or a semi-autonomous lawnmower.

Instead of inserting and removing the battery from the front of the lawnmower, alternate embodiments of the lawnmower may be configured for insertion/removal of the battery from either side, the rear, or the top of the lawnmower.

The foregoing description of embodiments and examples has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended the scope of the disclosure be defined by the claims appended hereto.

What is claimed is:

1. A latch assembly for a power equipment having a battery housing and a battery removably arranged inside the battery housing, comprising:

a latch housing coupled to or integral with the battery housing, the latch housing having a base and a cover arranged opposite to the base and defining a chamber therebetween, the latch housing defining a pair of aligned first grooves and a pair of aligned second grooves;

a lever configured to pivot about a fulcrum, wherein a first pin extends through the lever and is arranged inside the pair of aligned first grooves, the first pin and the pair of aligned first grooves together defining the fulcrum;

a push button rotatably coupled to the latch housing by a second pin arranged inside the pair of aligned second grooves, the push button including a handle portion and an engagement portion arranged in engagement with the lever;

a latch button coupled to the lever and configured to move vertically in response to the pivoting of the lever about the fulcrum; and a roller rotatably engaged to the latch button and adapted to be removably engaged with the battery to removably secure the battery inside the battery housing, wherein the roller is arranged inside a detent of the battery when the latch button is in a vertically upward position and is moved outwardly of the detent when the latch button is in a vertically downward position.

2. The latch assembly of claim 1, wherein the latch button is configured to move between the vertically upward position and the vertically downward position in response to the pivoting of the lever in a first direction and a second direction, respectively, wherein in the vertically upward position, the roller is engaged with the battery, and in the vertically downward position, the roller is disengaged from the battery.

3. The latch assembly of claim 2, wherein the latch button is biased to the vertically upward position.

4. The latch assembly of claim 1, wherein the push button adapted to be moved to pivot the lever about the fulcrum to disengage the roller from the battery, wherein the push button and the latch button are arranged on opposite sides of the fulcrum.

5. The latch assembly of claim 4, wherein the push button is rotatably coupled to the latch housing and rotates about a rotation axis to pivot the lever about the fulcrum.

6. The latch assembly of claim 5, wherein the push button includes a handle portion adapted to be pushed by a user to rotate the push button in a first direction about the rotational axis, and an engagement portion arranged in engagement with the lever to pivot the lever about the fulcrum in the second direction in response to the rotation of the push button in the first direction.

7. A power equipment, comprising:

a battery housing;

a battery removably coupled to the battery housing, the battery defining a detent; and a latch assembly configured to removably secure the battery with the battery housing, the latch assembly including a latch housing coupled to or integral with the battery housing, the latch housing having a base and a cover arranged opposite to the base and defining a chamber therebetween, the latch housing defining a pair of aligned first grooves and a pair of aligned second grooves, a lever configured to pivot about a fulcrum, wherein a first pin extends through the lever and is arranged inside the pair of aligned first grooves, the first pin and the pair of aligned first grooves together defining the fulcrum, a push button rotatably coupled to the latch housing by a second pin arranged inside the pair of aligned second grooves, the push button including a handle portion and an engagement portion arranged in engagement with the lever, a latch button coupled to the lever and configured to move vertically in response to the pivoting of the lever about the fulcrum; and a roller rotatably engaged to the latch button and adapted to be removably engaged with the battery to removably secure the battery inside the battery housing, wherein the roller is arranged inside the detent when the latch button is in a vertically upward position and is moved outwardly of the detent when the latch button is in a vertically downward position.

8. The power equipment of claim 7, wherein the roller is arranged inside the detent to secure the battery with the battery housing and the roller is moved outwardly of the detent to remove the battery from the battery housing.

9. The power equipment of claim 7, wherein the latch button is configured to move between the vertically upward position and the vertically downward position in response to the pivoting of the lever in a first direction and a second direction, respectively, wherein in the vertically upward position, the roller is engaged with the battery, and in the vertically downward position, the roller is disengaged from the battery.

10. The power equipment of claim 9, wherein the latch button is biased to the vertically upward position.

11. The power equipment of claim 7, wherein the push button adapted to be moved to pivot the lever about the fulcrum to disengage the roller from the battery, wherein the push button and the latch button are arranged on opposite sides of the fulcrum.

12. The power equipment of claim 11, wherein the push button is rotatably coupled to the latch housing and rotates about a rotation axis to pivot the lever about the fulcrum.

13. The power equipment of claim 12, wherein the push button includes a handle portion adapted to be pushed by a user to rotate the push button in a first direction about the rotational axis, and an engagement portion arranged in engagement with the lever to pivot the lever about the fulcrum in a second direction in response to the rotation of the push button in the first direction.

14. A lawnmower, comprising:

a cutter housing including a blade chamber;

a plurality of wheels connected to and supporting the cutter housing;

a blade arranged, at least partially, in the blade chamber and rotatably mounted to the cutter housing to rotate about a blade axis;

a battery housing supported on the cutter housing;

a battery removably arranged inside the battery housing, the battery defining a detent;

a motor mounted on the cutter housing to drive the blade;

a latch housing coupled to or integral with the battery housing, the latch housing having a base and a cover arranged opposite to the base and defining a chamber therebetween, the latch housing defining a pair of aligned first grooves and a pair of aligned second grooves;

a lever pivotably supported relative to the latch housing and configured to pivot about a fulcrum, wherein a first pin extends through the lever and is arranged inside the pair of aligned first grooves, the first pin and the pair of aligned first grooves together defining the fulcrum;

a push button rotatably coupled to the latch housing by a second pin arranged inside the pair of aligned second grooves, the push button including a handle portion and an engagement portion arranged in engagement with the lever;

a latch button coupled to the lever and configured to move vertically in response to the pivoting of the lever about the fulcrum; and a roller rotatably engaged to the latch button and adapted to be removably engaged with the battery to removably secure the battery inside the battery housing, wherein the roller is arranged inside the detent when the latch button is in a vertically upward position and is moved outwardly of the detent when the latch button is in a vertically downward position.

15. The lawnmower of claim 14, wherein the roller is arranged inside the detent to secure the battery with the battery housing and the roller is moved outwardly of the detent to remove the battery from the battery housing.

16. The lawnmower of claim 14, wherein the latch button is configured to move between the vertically upward position and the vertically downward position in response to the pivoting of the lever in a first direction and a second direction, respectively, wherein in the vertically upward position, the roller is engaged with the battery, and in the vertically downward position, the roller is disengaged from the battery.

17. The lawnmower of claim 14, wherein the latch button is biased to the vertically upward position.

18. The lawnmower of claim 1, wherein the push button operatively coupled to the lever and adapted to be moved to pivot the lever about the fulcrum to disengage the roller from the battery, wherein the push button and the latch button are arranged on opposite sides of the fulcrum.

19. The lawnmower of claim 18, wherein the push button is rotatably coupled to the latch housing and rotates about a rotation axis to pivot the lever about the fulcrum.

20. The lawnmower of claim 19, wherein the push button includes a handle portion adapted to be pushed by a user to rotate the push button in a first direction about the rotational axis, and an engagement portion arranged in engagement with the lever to pivot the lever about the fulcrum in a second direction in response to the rotation of the push button in the first direction.

* * * * *